(12) United States Patent
Agazzi et al.

(10) Patent No.: US 7,386,038 B2
(45) Date of Patent: *Jun. 10, 2008

(54) STARTUP PROTOCOL FOR HIGH THROUGHPUT COMMUNICATIONS SYSTEMS

(75) Inventors: Oscar E. Agazzi, Irvine, CA (US); John L. Creigh, Rancho Santa Margarita, CA (US)

(73) Assignee: Broadcom Corporation, Irvine, CA (US)

( * ) Notice: Subject to any disclaimer, the term of this patent is extended or adjusted under 35 U.S.C. 154(b) by 486 days.

This patent is subject to a terminal disclaimer.

(21) Appl. No.: 10/985,500

(22) Filed: Nov. 10, 2004

(65) Prior Publication Data
US 2005/0084002 A1 Apr. 21, 2005

Related U.S. Application Data

(63) Continuation of application No. 09/709,676, filed on Nov. 9, 2000, now Pat. No. 6,819,709, which is a continuation of application No. 09/078,466, filed on May 14, 1998, now Pat. No. 6,201,796.

(51) Int. Cl.
*H04L 5/16* (2006.01)

(52) U.S. Cl. ............... 375/220; 375/222; 375/232; 375/350; 370/287

(58) Field of Classification Search ............... 375/219, 375/220, 222, 231, 232, 254, 257, 259, 285, 375/346, 350; 370/278, 279, 282, 287, 2; 331/12; 708/305, 323; 379/344, 345, 410, 379/417, 399, 402

See application file for complete search history.

(56) References Cited

U.S. PATENT DOCUMENTS

| 5,864,545 A * | 1/1999 | Gonikberg et al. .......... 370/286 |
| 7,106,753 B2 * | 9/2006 | Lin ........................... 370/463 |

* cited by examiner

*Primary Examiner*—Dac V. Ha
(74) *Attorney, Agent, or Firm*—McAndrews, Held & Malloy, Ltd.

(57) ABSTRACT

A startup protocol is provided for use in a communications system having a plurality of transceivers, one transceiver acting as a master and another transceiver acting as slave, each transceiver having a noise reduction system, a timing recovery system and at least one equalizer. The operation of the startup protocol is partitioned into three stages. During the first stage the timing recovery system and the equalizer of the slave are trained and the noise reduction system of the master is trained. During the second stage the timing recovery system of the master is trained in both frequency and phase, the equalizer of the master is trained and the noise reduction system of the slave is trained. During the third stage the noise reduction system of the master is retrained, the timing recovery system of the master is retrained in phase and the timing recovery system of the slave is retrained in both frequency and phase. The protocol then enters a fourth stage in which the master transceiver and the slave transceiver are ready to communicate with each other.

26 Claims, 13 Drawing Sheets

STARTUP PROTOCOL FOR HIGH THROUGHPUT COMMUNICATIONS SYSTEMS

REFERENCE TO PRIOR APPLICATIONS

The present application is a continuation of U.S. patent application Ser. No. 09/709,676, filed on Nov. 9, 2000 now U.S. Pat. No. 6,819,709, entitled "Startup Protocol for High Throughput Communications Systems," which is a continuation of U.S. patent application Ser. No. 09/078,466, filed on May 14, 1998 now U.S. Pat. No. 6,201,796, entitled "Startup Protocol for High Throughput Communications Systems."

BACKGROUND OF THE INVENTION

1. Field of the Invention

This invention relates to methods of enabling the transmission and reception of signals through unshielded twisted pairs of wires within a communications system. The invention particularly relates to a startup protocol for initiating normal transmission between transceivers within a high throughput communications system. A "high throughput" as used within the context of this disclosure may include, but is not limited to, one gigabit (GB) per second.

2. Description of Related Art

A basic communications system is illustrated in FIG. 1. The system includes a hub and a plurality of computers serviced by the hub in a local area network (LAN). Four computers are shown by way of illustration but a different number of computers may be contained within the system. Each of the computers is usually displaced from the hub by a distance which may be as great as approximately one hundred meters (100 m.). The computers are also displaced from each other. The hub is connected to each of the computers by a communications line. Each communication line includes unshielded twisted pairs of wires or cables. Generally, the wires or cables are formed from copper. Four unshielded twisted pairs of wires are provided in each communication line between each computer and the hub. The system shown in FIG. 1 is operative with several categories of unshielded twisted pairs of cables designated as categories 3, 4 and 5 in the telecommunications industry. Category 3 cables are the poorest quality (and lowest cost) and category 5 cables are the best quality (and highest cost).

Associated with each communications system is a "throughput". The throughput of a system is the rate at which the system processes data and is usually expressed in bits/second. Most communications systems have throughputs of 10 megabits (Mb)/second or 100 Mb/second. A rapidly evolving area of communications system technology enables 1 Gb/second full-duplex communication over existing category-5 unshielded twisted pair cables. Such a system is commonly referred to as "Gigabit Ethernet."

A portion of a typical Gigabit Ethernet is shown in FIG. 2. The Gigabit Ethernet provides for transmission of digital signals between one of the computers and the hub and the reception of such signals at the other of the computer and the hub. A similar system can be provided for each of the computers The system includes a gigabit medium independent interface (GMII) block which receives data in byte-wide format at a specified rate, for example 125 MHz, and passes the data onto the physical coding sublayer (PCS) which performs scrambling, coding, and a variety of control functions. The PCS encodes bits from the GMII into 5-level pulse amplitude modulation (PAM) signals. The five signal levels are −2, −1, 0, +1, and +2. Communication between the computer and hub is achieved using four unshielded twisted pairs of wires or cables, each operating at 250 Mb/second, and eight transceivers, one positioned at each end of a unshielded twisted pair. The necessity of full-duplex bidirectional operation dictates the use of hybrid circuits at the two ends of each unshielded twisted pair. The hybrid controls access to the communication line, thereby allowing for full-duplex bidirectional operation between the transceivers at each end of the communications line.

A common problem associated with communications systems employing multiple unshielded twisted pairs and multiple transceivers is the introduction of crosstalk and echo noise or impairment signals into the transmission signals. Noise is inherent in all such communications systems regardless of the system throughput. However, the effects of these impairment signals are magnified in Gigabit Ethernet. Impairment signals include echo, near-end crosstalk (NEXT), and far-end crosstalk (FEXT) signals. As a result of these impairment signals the performance of the transceivers, particularly the receiver portion, is degraded.

NEXT is an impairment signal that results from capacitive coupling of the signals from the near-end transmitters to the input of the receivers. The NEXT impairment signals encountered by the receiver in transceiver A are shown in FIG. 3. The crosstalk signals from transmitters B, C, and D appears as noise to receiver A, which is attempting to detect the direct signal from transmitter E. Each of the receivers in the system encounter the same effect and accordingly the signals passing through the receivers experience signal distortion due to NEXT impairment signals. For clarity of FIG. 3, only the NEXT impairment experienced by receiver A is illustrated.

Similarly, because of the bidirectional nature of the communications systems, an echo impairment signal is produced by each transmitter on the receiver contained within the same transceiver as the transmitter. The echo impairment signal encountered by the receiver in each transceiver is shown in FIG. 4. The crosstalk signals from transmitters appear as noise to the receivers, which are attempting to detect the signal from the transmitter at the opposite end of the communications line. Each of the receivers in the system encounter the same effect and accordingly the signals passing through the receivers experience signal distortion due to the echo impairment signal.

Far-end crosstalk (FEXT) is an impairment that results from capacitive coupling of the signal from the far-end transmitters to the input of the receivers. The FEXT impairment signals encountered by the receiver in transceiver A are shown in FIG. 5. The crosstalk signals from transmitters F, G, and H appears as noise to receiver A, which is attempting to detect the direct signal from transmitter E. Each of the receivers in the system encounter the same effect and accordingly the signals passing through the receivers experience signal distortion due to the FEXT impairment signal. For clarity of FIG. 5 only the FEXT impairment experienced by receiver A is illustrated.

Four transceivers at one end of a communications line are illustrated in detail in FIG. 6. The components of the transceivers are shown as overlapping blocks, with each layer corresponding to one of the transceivers. The GMII, PCS, and hybrid of FIG. 6 correspond to the GMII, PCS, and hybrid of FIG. 2 and are considered to be separate from the transceiver. The combination of the transceiver and hybrid forms one "channel" of the communications system. Accordingly, FIG. 6 illustrates four channels, each of which operate in a similar manner. The transmitter portion of each transceiver includes a pulse-shaping filter and a digital-toanalog (D/A) converter. The receiver portion of each transceiver includes an analog-to-digital (A/D) converter, a first-in first-out (FIFO) buffer, a digital adaptive equalizer system including a feed-forward equalizer (FFE) and a detector. The receiver portion also includes a timing recovery system and a near-end noise reduction system including a NEXT cancellation system and an echo canceller.

One of the most critical phases of the operation of a Gigabit Ethernet transceiver is the startup. During this phase adaptive filters contained within the transceiver converge, the timing recovery subsystem acquires frequency and phase synchronization, the differences in delay among the four wire pairs are compensated, and pair identity and polarity is acquired. Successful completion of the startup allows normal operation of the transceiver to begin.

In one startup protocol, known as "blind start", the transceivers converge their adaptive filters and timing recovery systems simultaneously while also acquiring timing synchronization. A disadvantage of such a startup is that there is a high level of interaction among the various adaptation and acquisition algorithms within the transceiver. This high level of interaction reduces the reliability of the convergence and synchronization operations which occur during startup.

Thus there exists a need in the art to provide a startup protocol for use in a high throughput communications system, such as a Gigabit Ethernet, that uses the optimal sequence of operations and minimizes the interaction among the various adaptation and acquisition algorithms. The present invention fulfills these needs.

SUMMARY OF THE INVENTION

Briefly, and in general terms, the invention relates to methods of enabling the transmission and reception of signals through unshielded twisted pairs of wires within a communications system. The invention particularly relates to a startup protocol for initiating normal transmission between transceivers within a high throughput communications system.

In one embodiment, the invention is a startup protocol for use in a communications system having a plurality of transceivers, one transceiver acting as a master and another transceiver acting as slave, each transceiver having a noise reduction system, a timing recovery system and at least one equalizer. The startup protocol includes the step of executing a first stage during which the timing recovery system and the equalizer of the slave are trained and the noise reduction system of the master is trained. Also included is the step of executing a second stage during which the timing recovery system of the master is trained in both frequency and phase, the equalizer of the master is trained and the noise reduction system of the slave is trained. Further included is the step of executing a third stage during which the noise reduction system of the master is retrained, the timing recovery system of the master is retrained in phase and the timing recovery system of the slave is retrained in both frequency and phase.

By separating the convergence of the equalizer and the timing recovery system from the convergence of the noise reduction system the interaction among the various adaptation and acquisition algorithms within the transceiver is reduced. As a result, the reliability of the convergence and synchronization operations which occur during startup is improved. In addition, by retraining the timing recovery system of the master in phase and the timing recovery system of the slave during the third stage, the protocol allows for the enabling of the transmission and reception of signals within a communications system having a "free-running" slave clock. A "free-running" slave clock is one which does not freeze or save its state variables once they have been acquired.

In an additional aspect of the first embodiment, the startup protocol further includes the steps of initiating the first stage, transitioning from the first stage to the second stage, and transitioning from the second stage to the third stage. In another facet the step of initiating the first stage comprises the steps of transmitting a signal from the master to the slave, detecting the signal at the slave, and if the slave is transmitting, ceasing transmission from the slave. In a further aspect of the invention, the step of transitioning from the first stage to the second stage comprises the steps of transmitting a signal from the slave to the master, detecting the signal at the master; and ceasing transmission from the master. In yet another aspect, the step of transitioning from the second stage to the third stage comprises the steps of transmitting a signal from the master to the slave, detecting the signal at the slave, and continuing transmission from the slave.

In a second embodiment, the invention is a startup protocol for use in a communications system having a master transceiver at one end of a communications line and a slave transceiver at the opposite end of the communications line, each transceiver having a near-end noise reduction system, a far-end noise reduction system, a timing recovery system and at least one equalizer. The protocol includes the step of, during a first phase, maintaining the master in a half-duplex mode during which it transmits a signal but does not receive any signals, maintaining the slave in a half-duplex mode during which it receives the signal from the master but does not transmit any signals, converging the master near-end noise reduction system, adjusting the frequency and phase of the signal received by the slave such that the frequency and phase are synchronized with the frequency and phase of the signal transmitted by the master, and converging the equalizer of the slave. The protocol further includes the step of, during a second phase, maintaining the slave in a half-duplex mode during which it transmits a signal using a free-running clock but does not receive any signals, maintaining the master in a half-duplex mode during which it receives the signal from the slave but does not transmit any signals, converging the slave near-end noise reduction system, adjusting the frequency and phase of the signal received by the master such that the frequency and phase are synchronized with the frequency and phase of the signal transmitted by the slave, and converging the equalizer of the master. The protocol also includes the step of, during a third phase, maintaining the slave in a full-duplex mode such that the slave transmits and receive signals, maintaining the master in a full-duplex mode such that the master transmits and receive signals, reconverging the master near-end noise reduction system, adjusting the phase of the signal received by the master such that the phase is synchronized with the phase of the signal transmitted by the slave, adjusting the frequency and phase of the signal received by the slave such that the frequency and phase are synchronized with the frequency and phase of the signal transmitted by the master.

In a third embodiment, the invention is a startup protocol for use in a communications system having a plurality of transceivers, a first one of the transceivers acting as a master and a second one of the transceivers acting as a slave, each of the first and second ones of the transceivers including a transmitter and a receiver. The protocol includes the step of initially operating, in a first phase, the first transceiver only as a transmitter and the second transceiver only as a receiver and adjusting the timing of the second transceiver in accordance with the timing of the first transceiver and minimizing a change in the operation of the first transceiver as a transmitter as a result of the operation of the first transceiver as a receiver. Also included is the step of operating, in a second phase, the first transceiver only as a receiver and the second transceiver only as a transmitter and adjusting the timing of the first transceiver in accordance with the timing of the second transceiver and minimizing a change in the operation of the second transceiver as a transmitter as a result of the operation of the second transceiver as a receiver. Also included is the step of operating, in a third phase, the first and second transceivers simultaneously as transmitters and receivers, to adjust and fix the change in the operation of the first transceiver as a receiver as a result of the operation of the first transceiver as a transmitter.

In a fourth embodiment, the invention is a startup protocol for use in a communications system having plurality of transceivers, a first one of the transceivers acting as a master and a second one of the transceivers acting as a slave, each transceiver including a transmitter and a receiver. The protocol comprises the step of initially operating each of the first and second transceivers only as a transmitter and the other of the first and second transceivers only as a receiver to minimize a change in the operation of the transmitting transceiver transmitter as a result of the operation of the transmitting transceiver receiver and to provide adjustments in the timing of the receiving transceiver in accordance with the timing of the transmitting transceiver. Also included is the step of operating each of the first and second transceivers simultaneously both as a transmitter and a receiver to minimize a change in the operation of the transmitter in the first transceiver as a result of the operation of the receiver in the first transceiver and to provide adjustments in the timing of each transceiver in accordance with the timing of the other transceiver.

These and other aspects and advantages of the present invention will become apparent from the following more detailed description, when taken in conjunction with the accompanying drawings which illustrate, by way of example, the preferred embodiments of the invention.

DETAILED DESCRIPTION OF THE PREFERRED EMBODIMENTS

The discussion in this specification may be considered to relate specifically to a Gigabit Ethernet for the purposes of explanation and understanding of the invention. However, it will be understood that the concepts of this invention and the scope of the claims apply to other types of communications systems than a Gigabit Ethernet.

Figure 1:
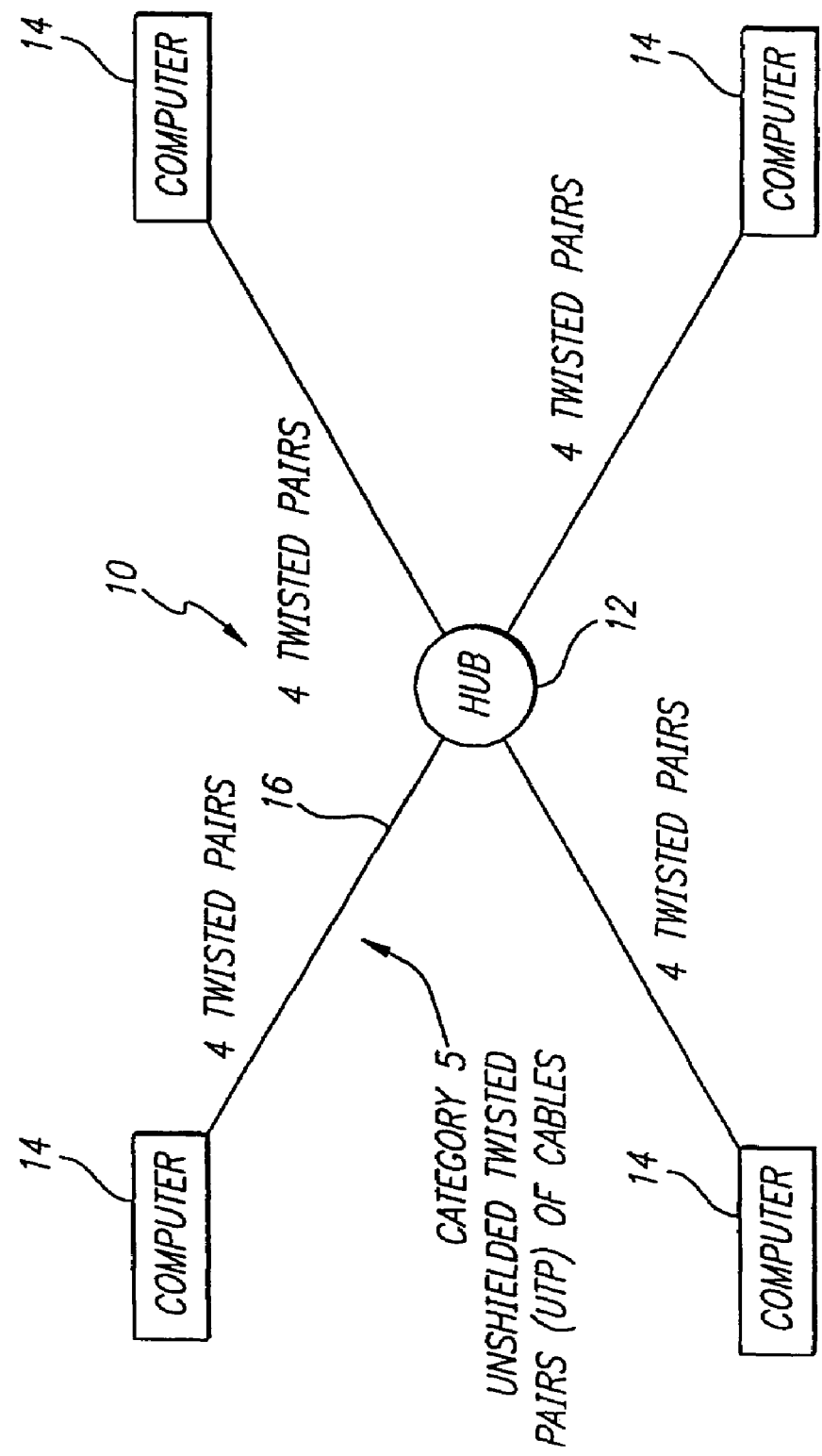
FIG. 1 is a schematic block diagram of a communications system providing a plurality of computers connected to a hub by communications lines to form a local area network (LAN)

A communications system which may incorporate the features of this invention is generally indicated at 10 in FIG. 1. The system 10 includes a hub 12 and a plurality of computers serviced by the hub in a local area network (LAN). Four computers 14 are shown by way of illustration but a different number of computers may be used without departing from the scope of the invention. Each of the computers 14 may be displaced from the hub 12 by a distance as great as approximately one hundred meters (100 m.). The computers 14 are also displaced from each other.

The hub 12 is connected to each of the computers 14 by a communications line 16. The communication line 16 comprises a plurality of unshielded twisted pairs of wires or cables. Generally, the wires or cables are formed from copper. Four unshielded twisted pairs of wires are provided in the system 10 between each computer and the hub 12. The system shown in FIG. 1 is operative with several categories of twisted pairs of cables designated as categories 3, 4 and 5 in the telecommunications industry. Category 3 cables are the poorest quality (and lowest cost) and category 5 cables are the best quality (and highest cost). Gigabit Ethernet uses category 5 cables.

Figure 2:
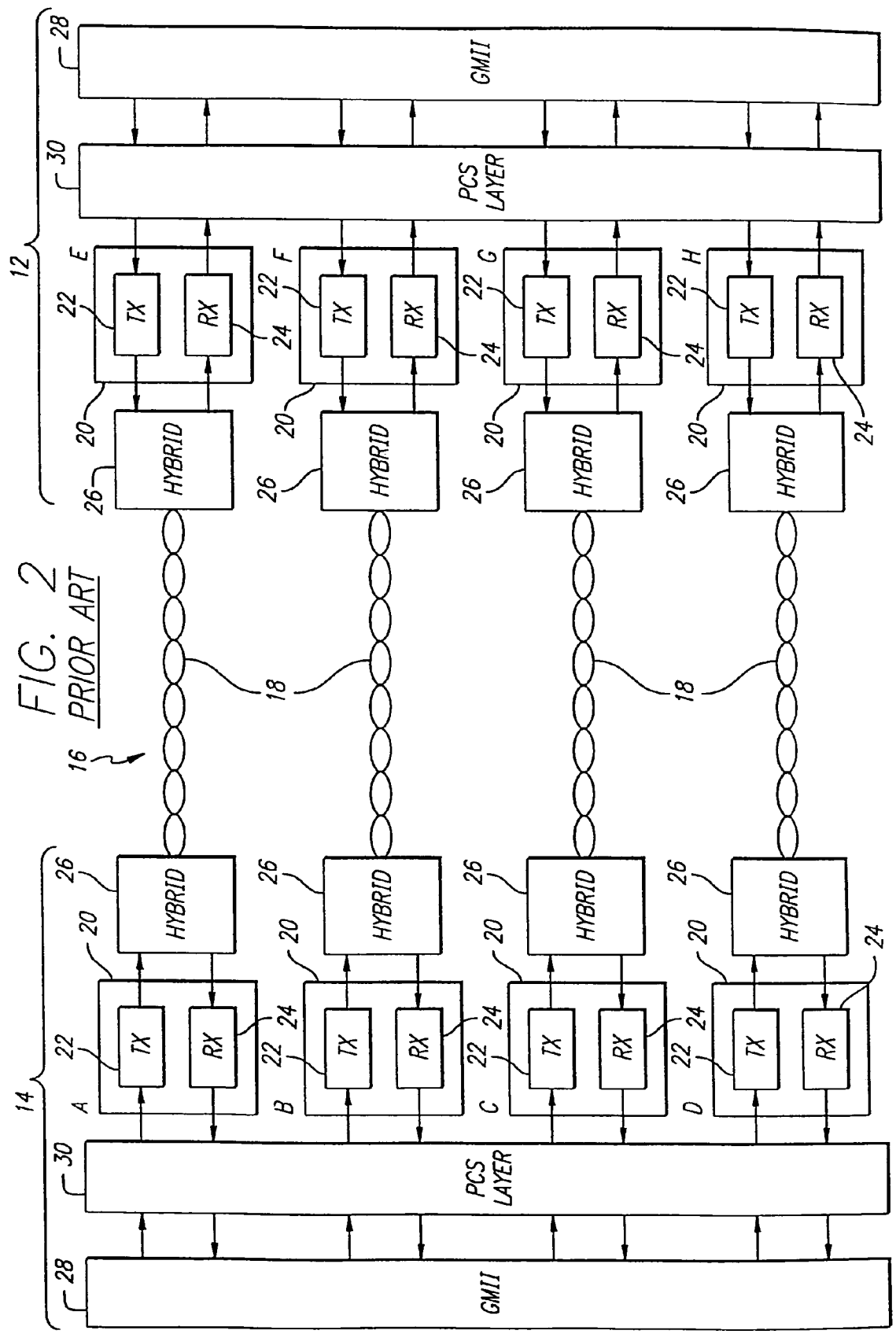
FIG. 2 is a schematic block diagram of a communications system providing a gigabit medium independent interface (GMII), a physical coding sublayer (PCS) and four transceiver channels each including an unshielded twisted wire pair and two transceivers, one at each end of the twisted wire pair.
Figure 3:
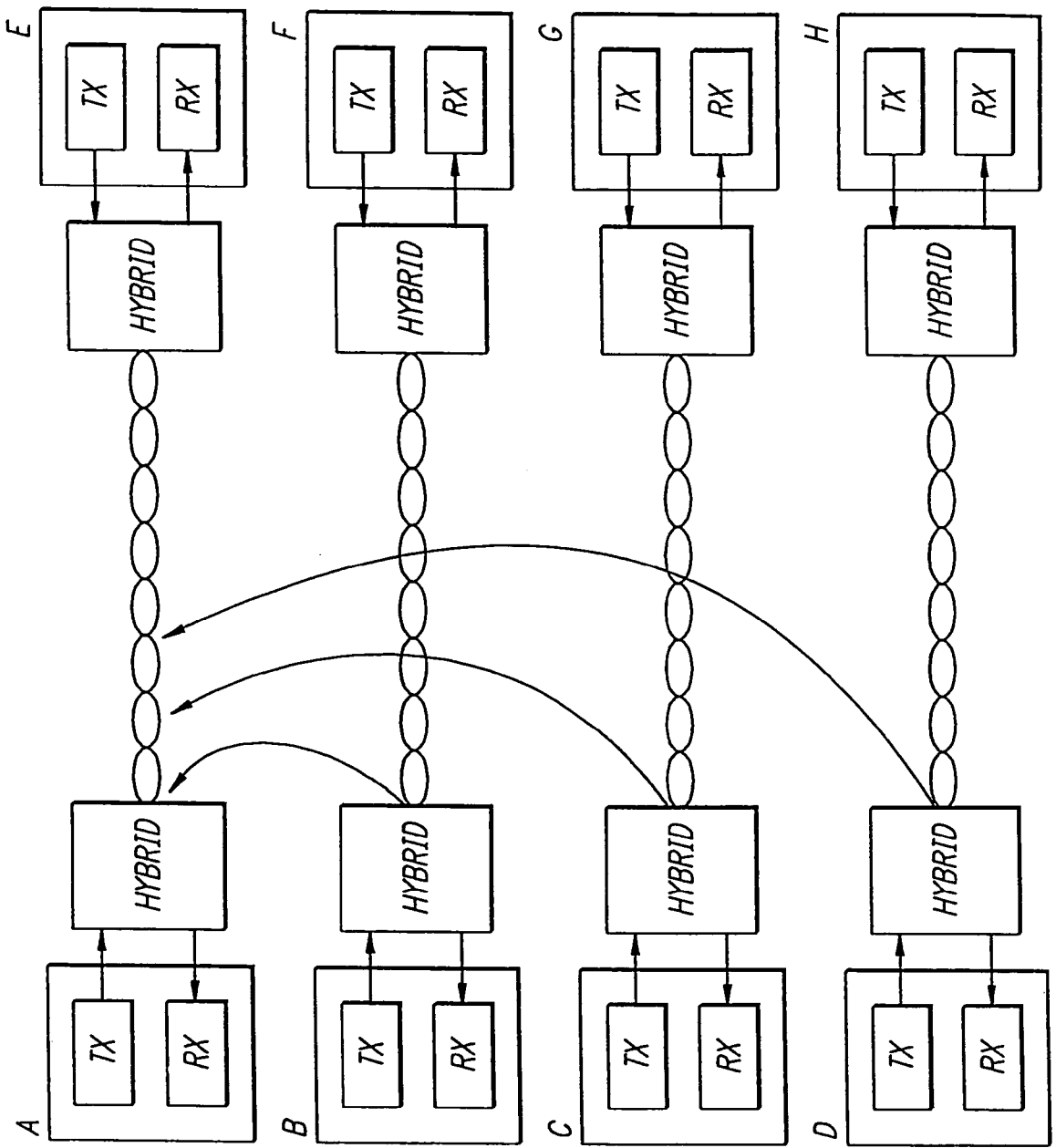
FIG. 3 is a schematic block diagram of a portion of the communications system of FIG. 2 depicting the NEXT impairment signals received by receiver A from adjacent transmitters B, C, and D.
Figure 4:
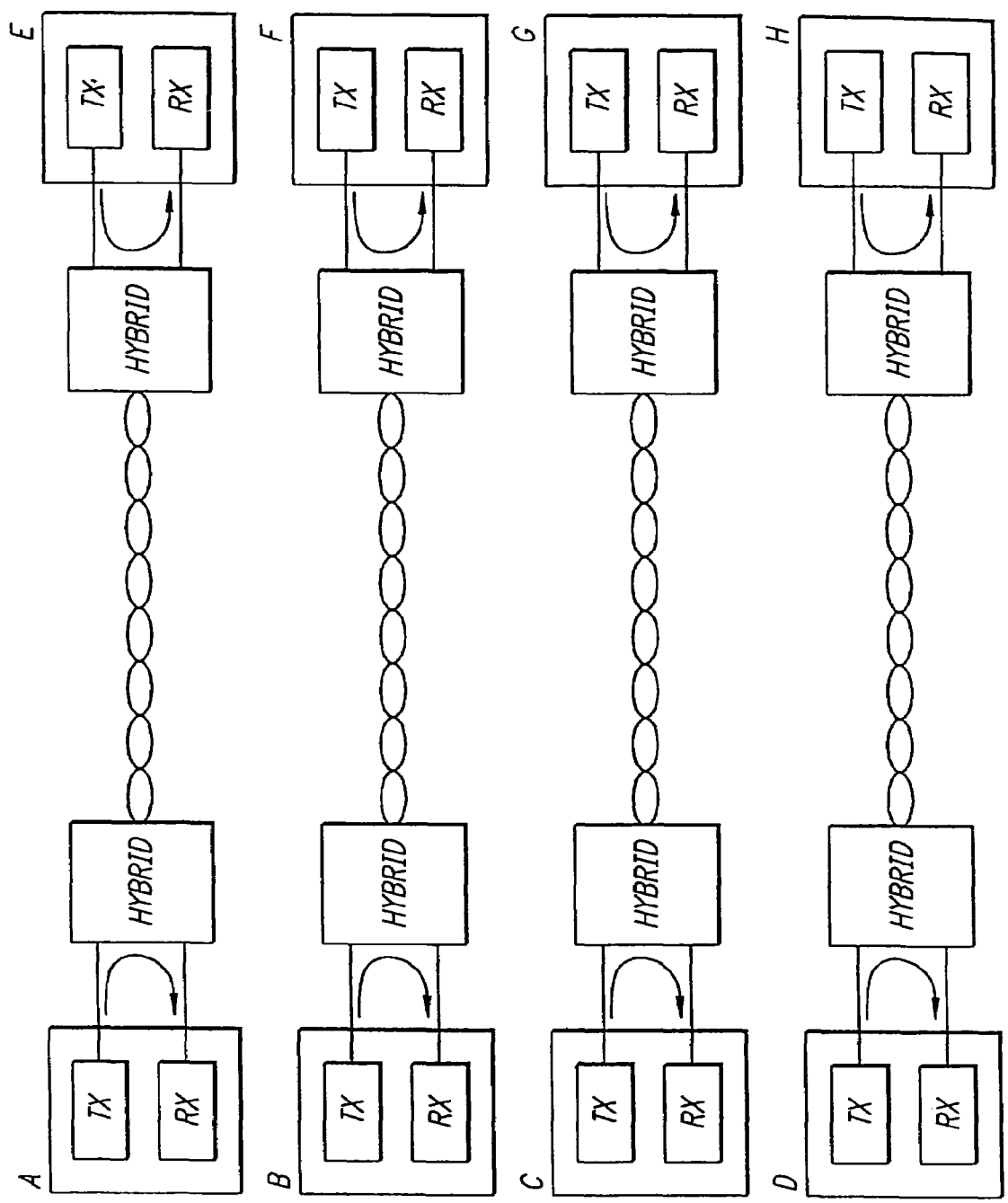
FIG. 4 is a schematic block diagram of a portion of the communications system of FIG. 2 depicting the echo impairment signal received by receiver A from transmitter A.
Figure 5:
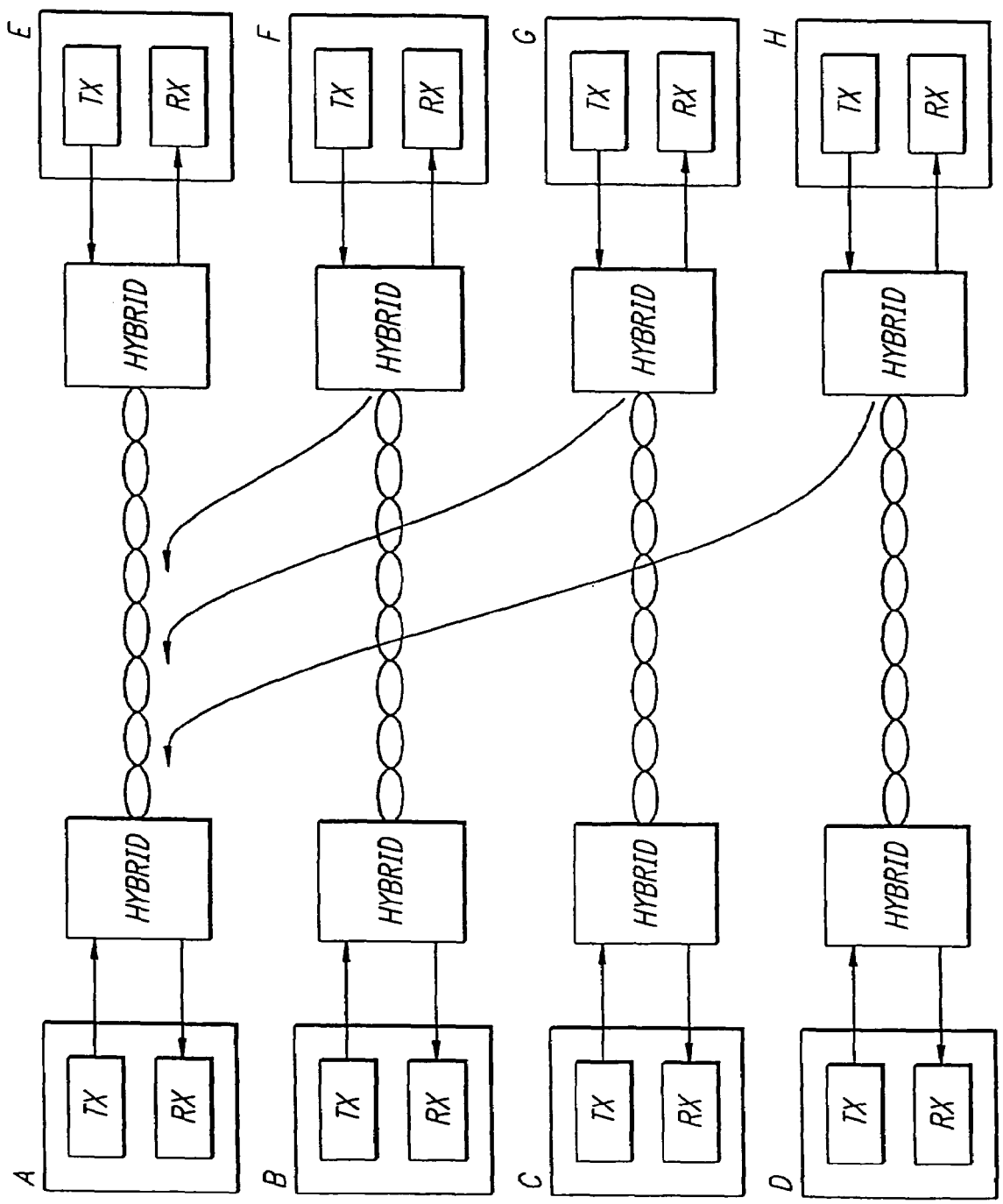
FIG. 5 is a schematic block diagram of a portion of the communications system of FIG. 2 depicting the FEXT impairment signals received by receiver A from opposite transmitters F, G, and H.

FIG. 2 illustrates, in detail, a portion of the communications system of FIG. 1 including one communications line 16 and portions of one of the computers 14 and the hub 12. The communications line 16 includes four unshielded twisted pairs of wires 18 operating at 250 Mb/second per pair. A transceiver 20, including a transmitter (TX) 22 and receiver (RX) 24, is positioned at each unshielded end of each twisted pair 18. Between each transceiver 20 and its associated unshielded twisted pair 18 is a hybrid 26. The hybrid 26 controls access to the communication line 16, thereby allowing for full-duplex bidirectional operation between the transceivers 20 at each end of the communications line. The hybrid also functions to isolate the transmitter and receiver associated with the transceiver, from each other.

The communications system includes a standard connector designated as a GMII. The GMII may be an eight bit wide data path in both the transmit and receive directions. Clocked at a suitable frequency, such as 125 MHz, the GMII results in a net throughput in both directions of data at a suitable rate such as 250 Mb/second per pair. The GMII provides a symmetrical interface in both the transmit and receive directions. A physical coding sublayer (PCS) 30 receives and transmits data between the GMII 28 and the transceivers 20. The PCS 30 performs such functions as scrambling and encoding/decoding data before forwarding the data to either the transceiver or the GMII. The PCS encodes bits from the GMII into 5-level pulse amplitude modulation (PAM) signals. The five signal levels are −2, −1, 0, +1, and +2. The PCS also controls several functions of the transceivers, such as skew control as explained below.

Figure 7:
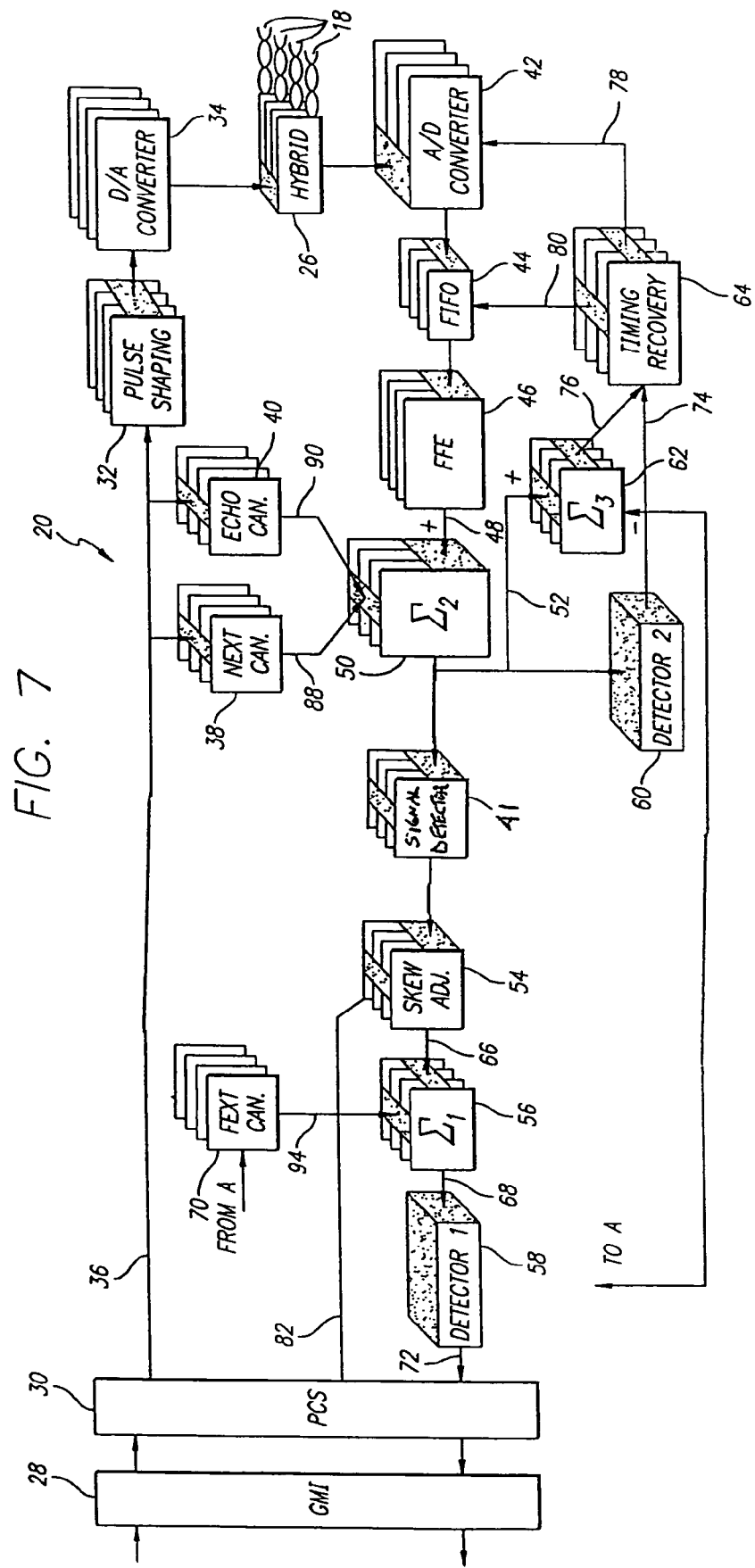
FIG. 7 is a schematic block diagram of a communications system in accordance with one embodiment of the present invention including a plurality of transceivers each having a NEXT cancellation system, an echo canceller, and a FEXT cancellation system, digital adaptive filter system including a plurality of detectors and a skew adjuster, and a timing recovery circuit.

Four of the transceivers 20 are illustrated in detail in FIG. 7. The components of the transceivers 20 are shown as overlapping blocks, with each layer corresponding to one of the transceivers. The GMII 28, PCS 30, and hybrid 26 of FIG. 7 correspond to the GMII, PCS, and hybrid of FIG. 2 and are considered to be separate from the transceiver. The combination of the transceiver 20 and hybrid 26 forms one "channel" of the communications system. Accordingly, FIG. 7 illustrates four channels, each of which operate in a similar manner. The transmitter portion of each transceiver 20 includes a pulse shaping filter 32 and a D/A converter 34. The pulse shaping filter 32 receives one one-dimensional (1-D) symbol from the PCS. This symbol is referred to as a TXDatax symbol 36, where x is 1 through 4 corresponding to each of the four channels. The TXDatax symbol 36 represents 2 bits of data. The PCS generates one 1-D symbol for each of the channels. The symbol for each channel goes through a spectrum shaping filter of the form $0.75+0.25\ z^{-1}$ at the pulse shaping filter 32 to limit emissions within FCC requirements. This simple filter shapes the spectrum at the output of the transmitter so that its power spectral density falls under that of communications systems operating at 100 Mb/second on two pairs of category-5 twisted pair wires. The symbol is then converted into an analog signal by the D/A converter 34 which also acts as a lowpass filter. The analog signal gains access to the unshielded twisted pair wire 18 through the hybrid circuitry 26.

The receiver portion of each transceiver includes a signal detector 41, an A/D converter 42, a FIFO 44, a digital adaptive equalizer system, a timing recovery circuit and a noise reduction system. The digital adaptive equalizer system includes a FFE 46, two devices 50, 56, a skew adjuster 54 and two detectors 58, 60. The functions of these components are explained below. The general concept of the use of a digital adaptive equalizer in a communications system is disclosed in U.S. Pat. No. 5,604,741 to Samueli et al. entitled ETHERNET SYSTEM. The noise reduction system comprises a near-end noise reduction system which includes a NEXT cancellation system 38 and an echo canceller 40, and a far-end noise reduction system which includes a FEXT cancellation system 70. Details of the noise reduction system are disclosed in copending patent application Ser. No. 09/037,328 entitled APPARATUS FOR, AND METHOD OF, REDUCING NOISE N A COMMUNICATIONS SYSTEM and assigned of record to the assignee of record of this application.

The A/D converter 42 receives signals from the hybrid 26 and provides digital conversions of the signals received at a suitable frequency, such as 125 MHz, which is equal to the baud rate of the signals. The A/D converter 42 samples the analog signals in accordance with an analog sample clock signal 78 provided by the decision-directed timing recovery circuit 64. The FIFO 44 receives the digital conversion signals from the A/D converter 42 and stores them on a first-in-first-out basis. The FIFO forwards individual signals to the FFE 46 in accordance with a digital sample clock signal 80 provided by the timing recovery circuit 64. The FFE 46 receives digital signals from the FIFO and filters these signals. The FFE 46 is a least mean squares (LMS) type adaptive filter which performs channel equalization and precursor inter symbol interference (ISI) cancellation to correct for distortions in the signal.

It should be noted that the signal introduced into the A/D converter 42 and subsequently into the FIFO 44 and FFE 46 has several components. These components include the direct signal received directly from the transmitter 22 at the opposite end of the unshielded twisted pair wire 18 with which the receiver 24 is associated. Also included are one or more of the NEXT, echo, and FEXT impairment signals from other transmitters 22 as previously described. The signal including the direct signal and one or more of the impairment signals is referred to as a "combination signal."

The FFE 46 forwards the combination signal 48 to a second device 50, typically a summing device. At the second device 50 the combination signal 48 is combined with the outputs of the NEXT cancellation system 38 and echo canceller 40 to produce a signal which is substantially devoid of NEXT and echo impairment signals. This signal is referred to as a "first soft decision" 52. The signal detector 41 detects the signals from the second device 50 and forwards the signals to the skew adjuster 54. Upon signal detection, the signal detector 41 initiates various system operations, one of which—as described below—includes transitioning between phases of the startup protocol. The skew adjuster 54 receives the first soft decision 52 from the second device 50 and outputs a signal referred to as a "second soft decision" 66. The skew adjuster 54 performs two functions. First, it compensates for the difference in length of the unshielded twisted pairs 18 by delaying the first soft decision 52 so that the second soft decisions 66 from all of the receivers in the system are in sync. Second, it adjusts the delay of the first soft decision 52 so that the second soft decision 66 arrives at the first device 56 at substantially the same time as the output of the FEXT cancellation system 70. The skew adjuster 54 receives skew control signals 82 from the PCS 30.

The skew adjuster 54 forwards the second soft decision 66 to a first device 56, typically a summing device. At the first device 56 the second soft decision 66 is combined with the output of the FEXT cancellation system 70 to produce a signal which is substantially devoid of FEXT impairment signals. This signal is referred to as a "third soft decision" 68. The first detector 58 receives the third soft decision 68 from the first device 56. The first detector 58 provides an output signal, i e., a "final decision" 72. The detector may be a slicer which produces a final decision 72 corresponding to the analog signal level closest in magnitude to the level of the third soft decision 68. The detector may also be either a symbol-by-symbol detector or a sequential detector which operates on sequences of signals across all four channels simultaneously, such as a Viterbi decoder.

Figure 8:
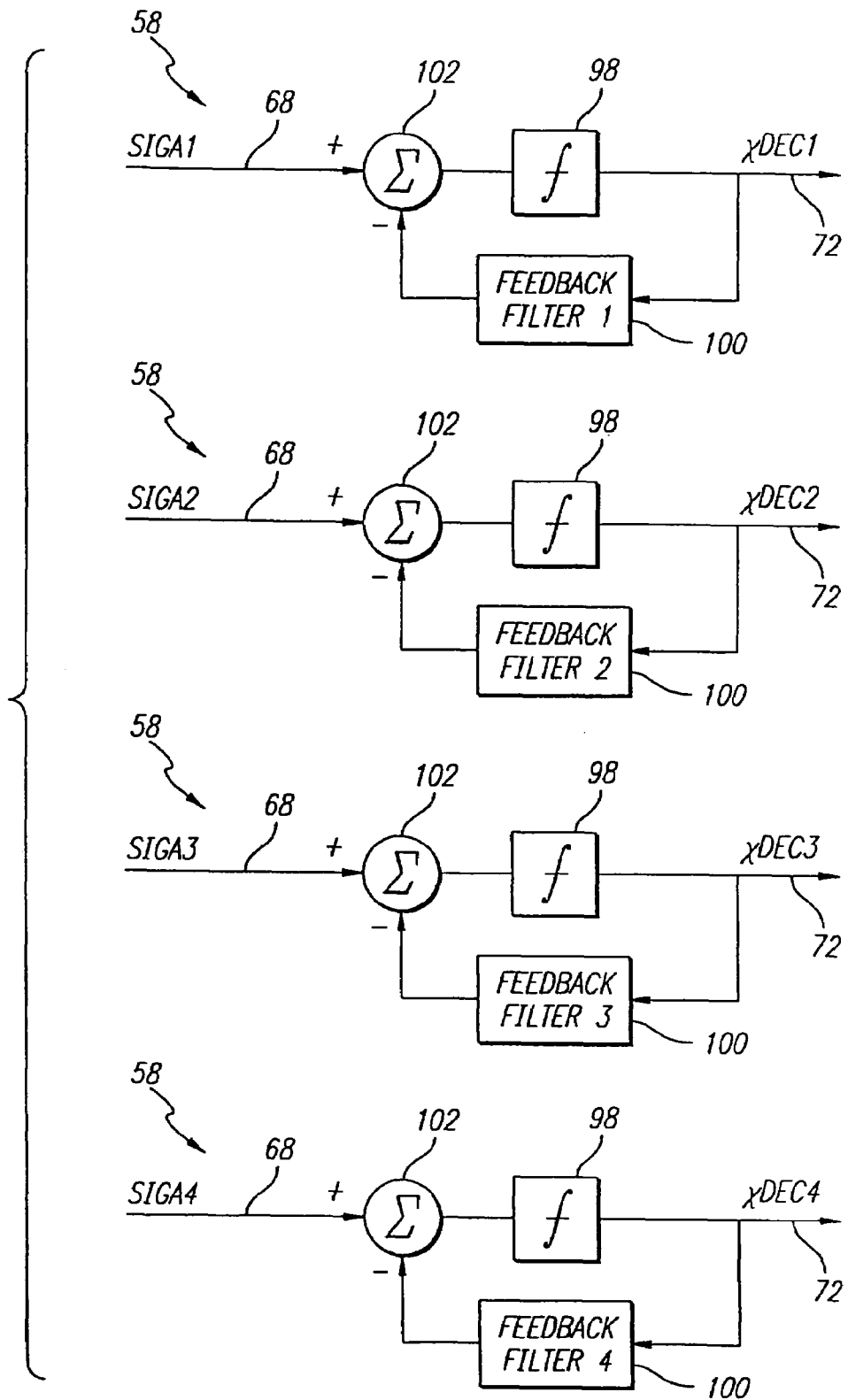
FIG. 8 is a schematic block diagram of a symbol-by-symbol detector of FIG. 7, each including a plurality of slicers, feedback filters and adders and receiving as input a soft decision.

In one configuration of the transceiver the first detector 58 is a symbol-by-symbol detector. A group of symbol-by-symbol detectors 58, one for each channel, is shown in FIG. 8. Each first detector 58 includes a slicer 98, adaptive feedback filter 100 and an adder 102. The adder 102 combines the third soft decision 68 with the output of the adaptive feedback filter 100 to provide an output which is introduced to the slicer 98. The output of the slicer 98 in introduced to the adaptive feedback filter 100. The first detector 58 provides an output signal 72 which corresponds to the discrete level from the set [−2, −1, 0, 1, 2] which is closest to the difference between the third soft decision 68 and the output of the feedback filter 100. The adaptive feedback filter 100 corrects for distortion in the third soft decision 68. This filter 100 uses past slicer 98 decisions to estimate postcursor ISI caused by the channel. This ISI is canceled from the third soft decision 68 to form the final decision signal 72.

In another configuration of the transceiver the first detector 58 is a combination of a sequential decoder with a decision feedback equalizer (DFE) using the architecture usually known as multiple DFE architecture (MDFE) sequential detector. The sequential decoder 58 looks at all signals from all four channels at the same time and at successive samples from each channel over several periods of unit time. A sequential decoder receives as input at least one signal from each of the first devices 56. The sequential decoder 58, in general, is responsive to the sequences of the output signals from the first devices 56 for (1) passing acceptable sequences of such signals and (2) discarding unacceptable sequences of such signals in accordance with the constraints established by the code standard associated with the system. Acceptable sequences are those which obey the code constraints and unacceptable sequences are those which violate the code constraints.

The second detector 60 (FIG. 7) receives the first soft decision 52 from the second device 50. The second detector 60 is a symbol-by-symbol detector. It provides an output signal 74 which corresponds to the discrete level from the set [−2, −1, 0, 1, 2] which is closest to the difference between the first soft decision 52 and the output of the feedback filter 100. The second detector 60 produces output signals 74 without the benefit of FEXT cancellation, as a result, these decisions have a higher error rate than those made by the first detector 58, which enjoys the benefits of FEXT cancellation. Because of this fact, these decisions are called "tentative decisions". The coefficients of this adaptive feedback filter 100 are the same as those of the adaptive feedback filter associated with the first detector 58 (FIG. 7).

A third device 62, typically a summing device, receives the first soft decision signal 52 from the second device 50 and the tentative decision signals 74 from the second detector 60. At the third device 62 the first soft decision 52 is combined with the tentative decision signal 74 to produce an error signal 76 which is introduced into the timing recovery circuit 64. The timing recovery circuit 64 receives the tentative decision 74 from the second detector 60 and the error signals 76 from the third device 62. Using these signals as inputs the timing recovery circuit 64 outputs an analog clock sync signal 78 which is introduced to the A/D converter 42 and a digital clock sync signal 80 which is introduced into the FIFO 44. As previously mentioned, these signals control the rate at which the A/D converter 42 samples the analog input it receives from the hybrid 26 and the rate at which the FIFO forwards digital signals to the FFE 46. A suitable timing recovery device for use in the present invention is disclosed in copending patent application Ser. No. 08/970,557 entitled APPARATUS FOR, AND METHOD OF, PROCESSING SIGNALS TRANSMITTED OVER A LOCAL AREA NETWORK and assigned of record to the assignee of record of this application.

Figure 9:
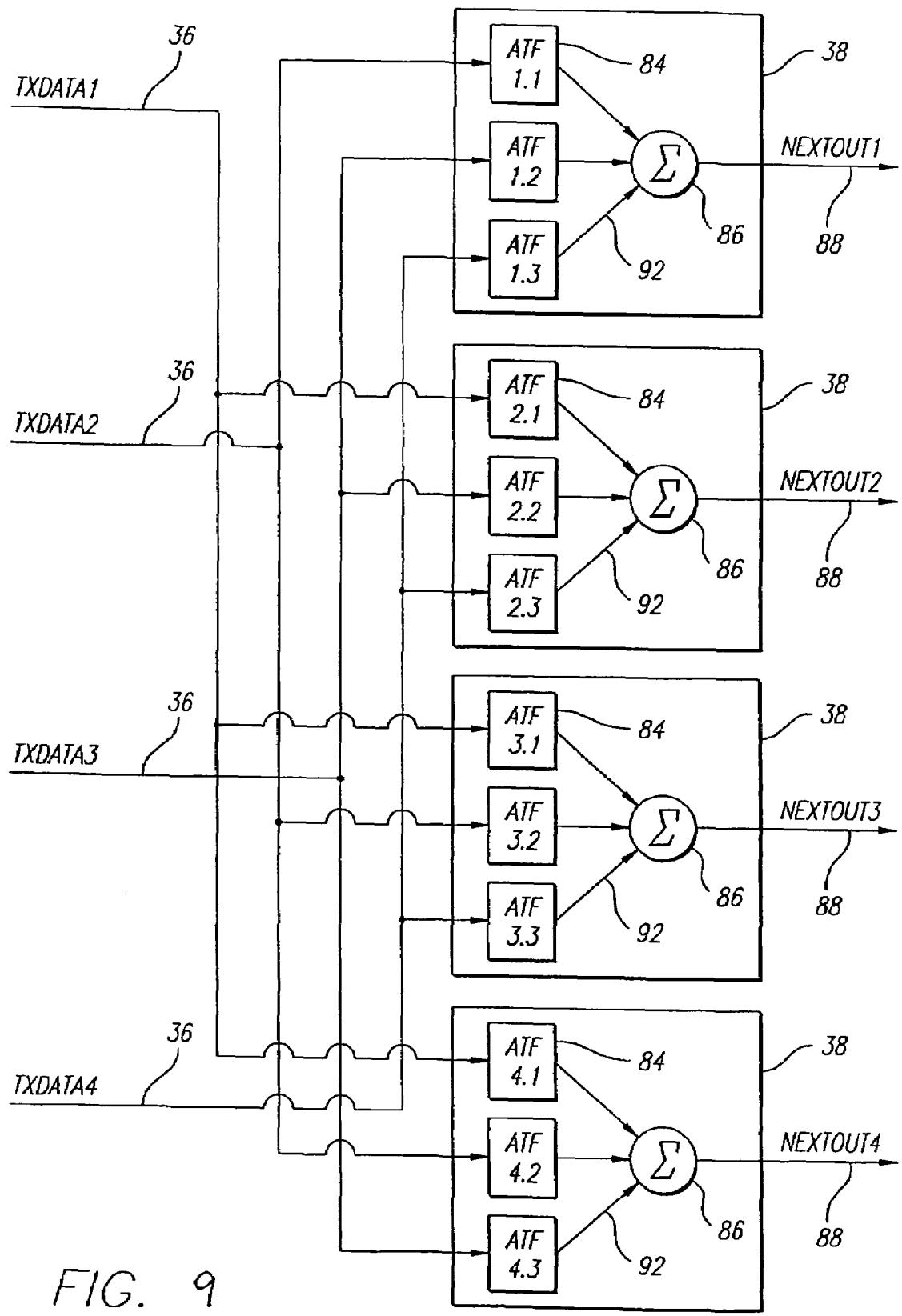
FIG. 9 is a schematic block diagram of the NEXT cancellation systems of FIG. 7, each including a plurality of adaptive transversal filters (ATF) and adders and receiving as input transmitted signals from adjacent transmitters.

As mentioned before, the symbols sent by the transmitters 22 (FIG. 2) in the communications system cause NEXT, echo and FEXT impairments in the received signal for each channel. Since each receiver 24 has access to the data for the other three channels that cause this interference, it is possible to nearly cancel each of these effects. NEXT cancellation is accomplished using three adaptive NEXT cancelling filters as shown in the block diagram of FIG. 9. Each NEXT cancellation system 38 receives three TXDatax symbols 36 from each of the transmitters at the same end of the communications line 18 as the receiver with which the NEXT cancellation system is associated. Each NEXT cancellation system 38 includes three filters 84, one for each of the TXDatax symbols 36. These filters 84 model the impulse responses of the NEXT noise from the transmitters and may be implemented as adaptive transversal filters (ATF) employing, for example, the LMS algorithm. The filters 84 produce a replica of the NEXT impairment signal for each TXDatax symbol 36. A summing device 86 combines the three individual replica NEXT impairment signals 92 to produce a replica of the NEXT impairment signal contained within the combination signal received by the receiver with which the NEXT cancellation system 38 is associated. The replica NEXT impairment signal 88 is introduced into the second device 50 (FIG. 7) where it is combined with the combination signal 48 to produce a first soft decision signal 52 which is substantially devoid of NEXT impairment signals.

Figure 6:
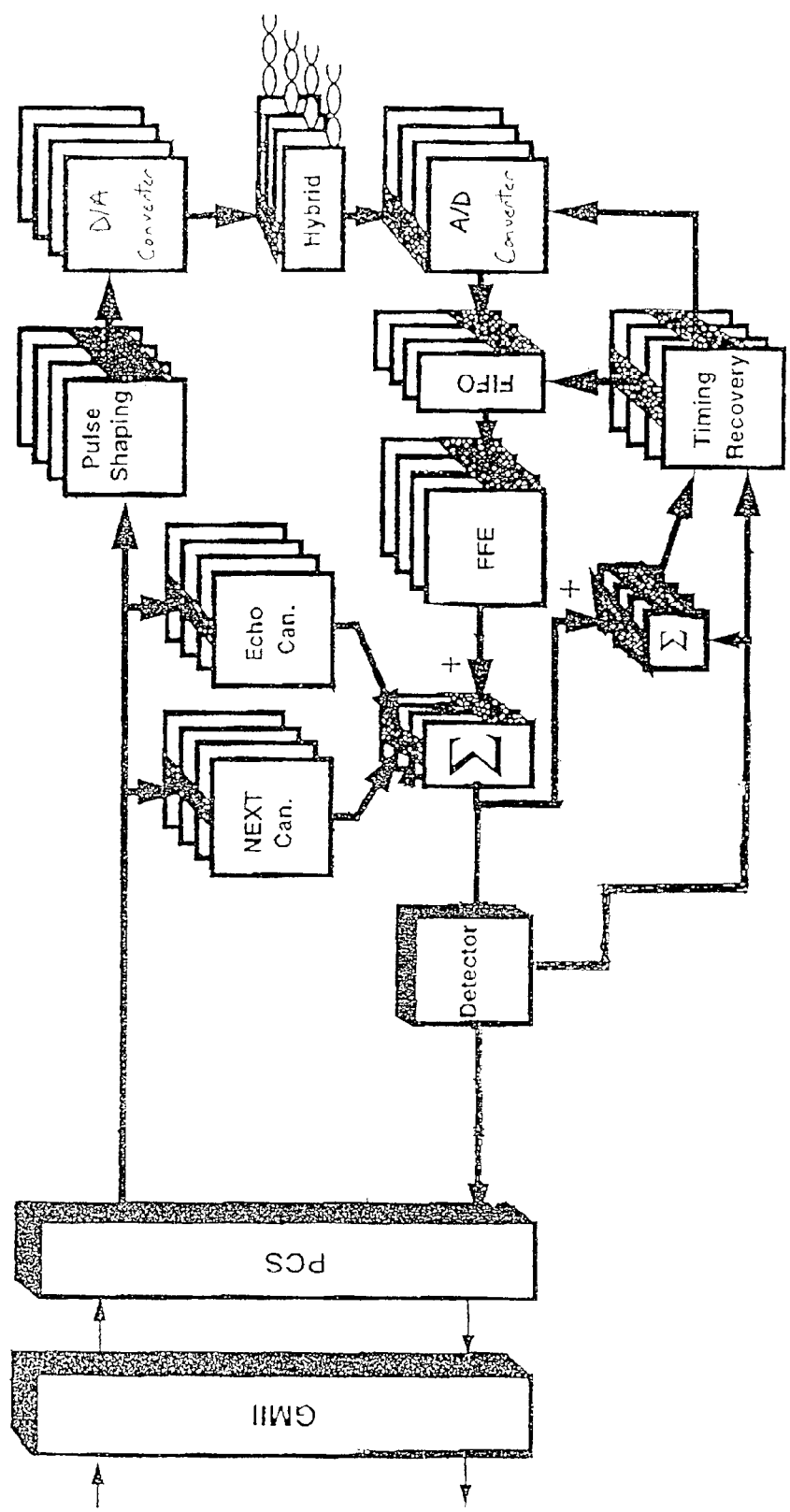
FIG. 6 is a schematic block diagram of a communications system including a plurality of transceivers, each having a NEXT cancellation system, an echo canceller, a feed forward equalizer, digital adaptive filter system including one detector, and a timing recovery circuit.
Figure 10:
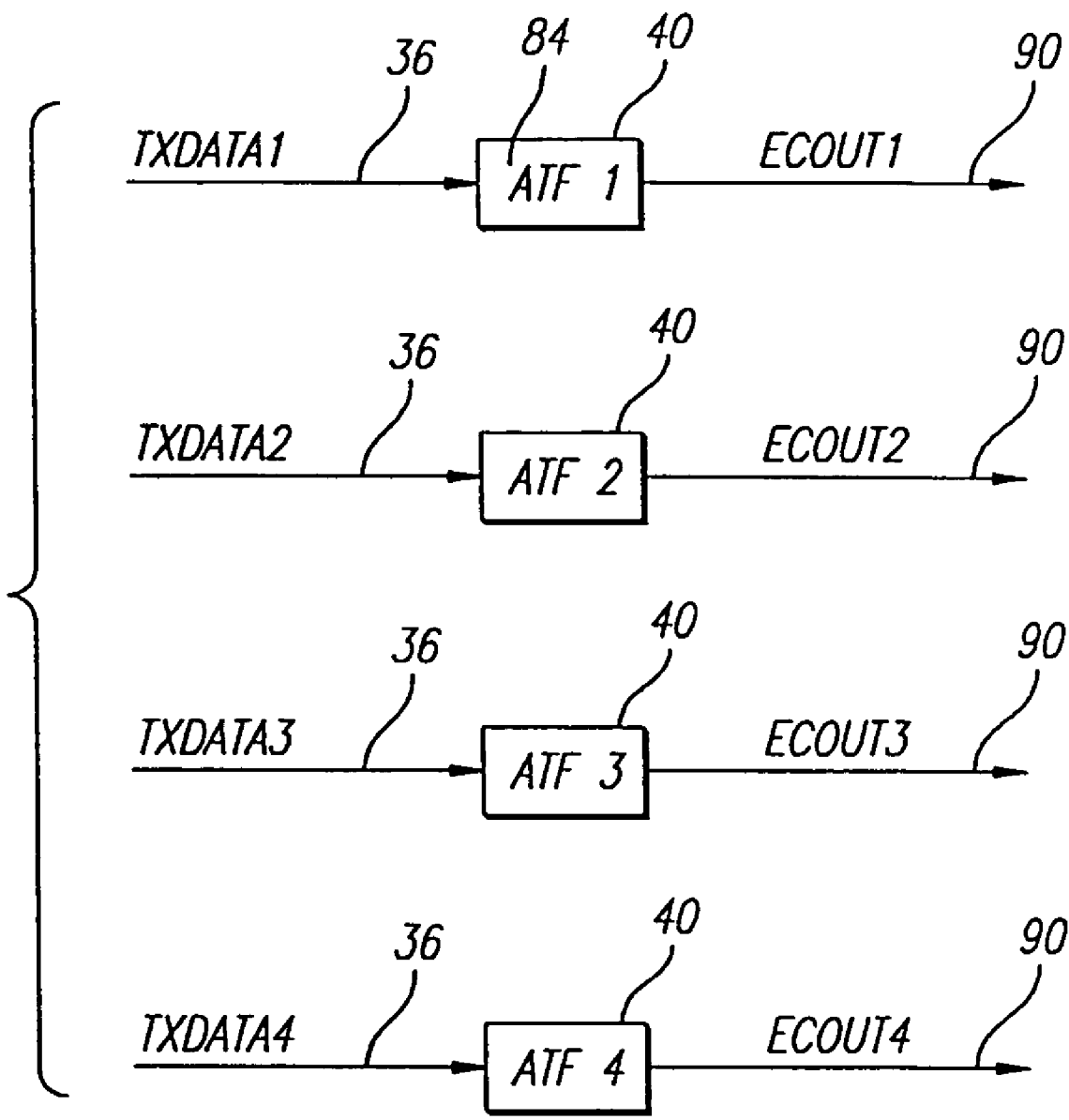
FIG. 10 is a schematic block diagram of the echo cancellers of FIG. 7, each including an ATF and receiving as input transmitted signals from same transmitters.

Echo cancellation is accomplished with an adaptive canceling filter 85 as shown in the block diagram of FIG. 10. Each echo canceller 40 receives the TXDatax symbols 36 from the transmitter at the same end of the twisted wire pair 18 as that of the receiver with which the echo canceller is associated. As shown in FIG. 10, each echo canceller 40 includes one filter 85. These filters 85 model the impulse responses of the echo noise from the transmitter and may be implemented as ATFs employing, for example, the LMS algorithm. The filter produces a replica of the echo impairment signal contained within the combination signal received by the receiver with which the echo canceller 40 is associated. The replica echo impairment signal 90 is introduced into the second device 50 (FIG. 6) where it is combined with the combination signal 48 to produce the first soft decision signal 52 which is substantially devoid of echo impairment signals.

Figure 11:
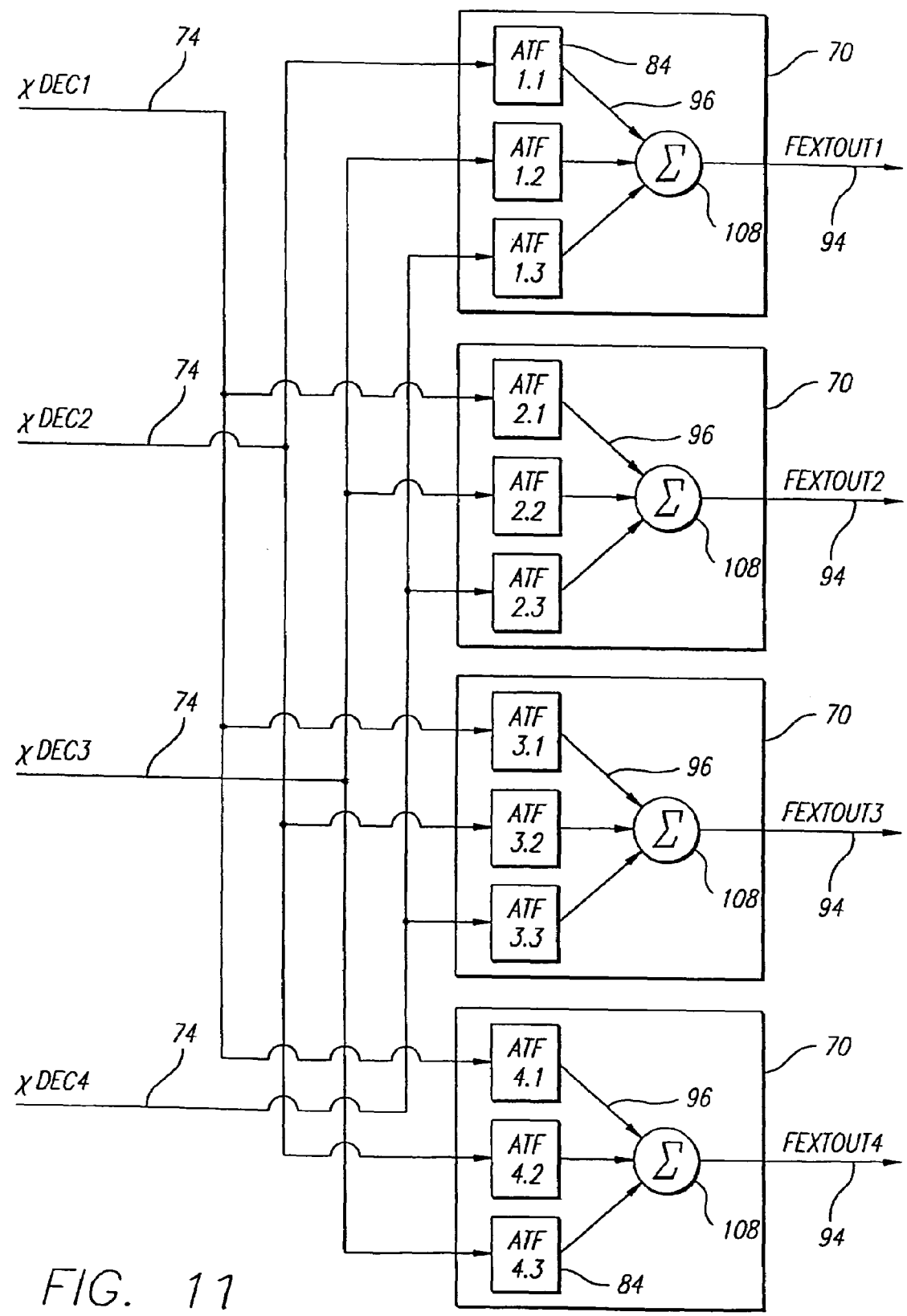
FIG. 11 is a schematic block diagram of the FEXT cancellation systems of FIG. 7, each including a plurality of ATFs and an adder and receiving as input transmitted signals from opposite transmitters.

FEXT cancellation is accomplished with three adaptive FEXT canceling filters 87 as shown in the block diagram of FIG. 11. Each FEXT cancellation system 70 receives three tentative decision symbols 74 one from each of the receivers at the same end of the communications line as the receiver with which the FEXT cancellation system is associated. Each FEXT cancellation system 70 includes three filters 87, one for each of the tentative decision symbols 74. These filters 87 model the impulse responses of the FEXT noise from transmitters and may be implemented as ATFs employing, for example, the LMS algorithm. The filters 87 produce a replica of the FEXT impairment signal 96 for each individual tentative decision symbol 74. A summing device 108 combines the three individual replica FEXT impairment signals 96 to produce a replica of the FEXT impairment signal contained within the combination signal 48 received by the receiver with which the FEXT cancellation system is associated. The replica FEXT impairment signal 94 is introduced into the first device 56 (FIG. 7) where it is combined with the second combination signal 66 to produce the third soft decision signal 68 which is substantially devoid of FEXT impairment signals. It is important to note that the higher error rate of the tentative decisions 74 does not degrade the performance of the FEXT cancellation system 70, because the decisions used to cancel FEXT are statistically independent from the final decisions 72 made by the receiver whose FEXT is being canceled.

The symbols provided by the first detector 58 are decoded and descrambled by the receive section of the PCS 30 before being introduced to the GMII. Variations in the way the wire pairs are twisted may cause delays through the four channels by up to 50 nanoseconds. As a result, the symbols across the four channels may be out of sync. As previously mentioned, in the case where the first detector is a sequential detector, the PCS also determines the relative skew of the four streams of 1-D symbols and adjusts the symbol delay, through the skew adjuster 54, prior to their arrival at the first detector 58 so that sequential decoder can operate on properly composed four dimensional (4-D) symbols. Additionally, since the cabling plant may introduce wire swaps within a pair and pair swaps among the four unshielded twisted pairs, the PCS 30 also determines and corrects for these conditions.

One of the most critical phases of the operation of the communications system is the transceiver startup. During this phase the adaptive filters contained within the FFE 46 (FIG. 7), echo canceller 40, NEXT cancellation system 38, FEXT cancellation system 70, timing recovery system 64 and detector 58 of the receiver portion of each transceiver converge. During convergence the actual output of the adaptive filters are compared to expected output of the filters to determine the error. The error is reduced to substantially zero by adjusting the coefficients of the algorithm which defines the transfer function of the filter. Similarly, the timing recovery system is converged by adjusting the frequency and phase of the phase lock loop and the local oscillator contained within the timing recovery system so that the signal-to-noise ratio of the channel is optimized. In addition, the differences in delay among the four wire pairs are compensated, and pair identity and polarity, are acquired. Successful completion of the startup ensures that the transceiver can begin normal operation.

Figure 12:
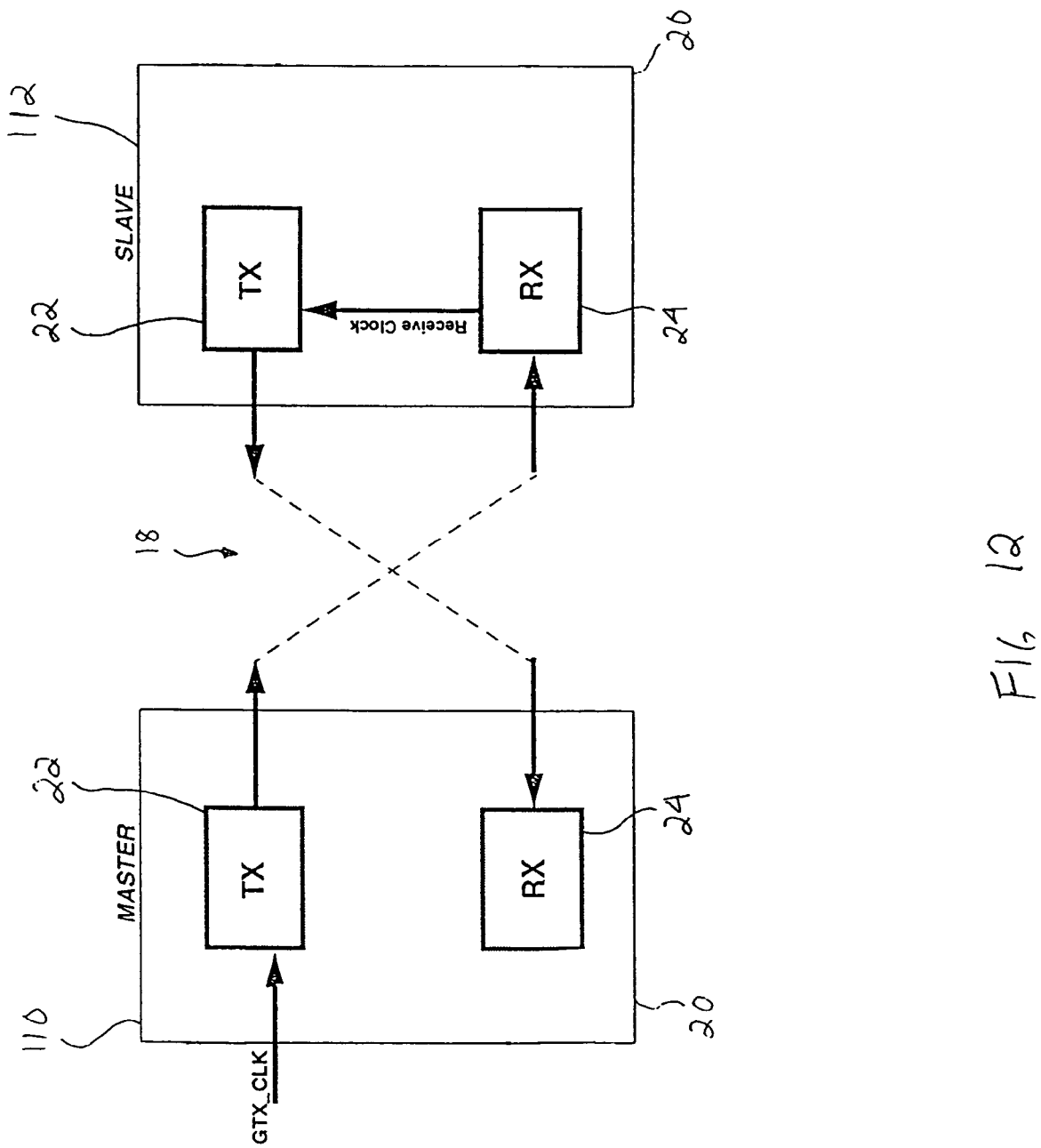
FIG. 12 is a schematic block diagram depicting the master-slave relationship between the transceivers of each of the transceiver channels of FIG. 2.

In accordance with the present invention each of the transceiver channels operate in a loop-timed fashion, as shown in FIG. 12. The transceivers 20 at the two ends of the each twisted wire pair 18 assume two different roles as far as synchronization is concerned. One of the transceivers, called the master 110, transmits data using an independent clock GTX_CLK provided through the GMII interface 28 (FIG. 7). This clock signal is fixed in both frequency and phase and is provided to the master transceiver 110 of each the four transceiver channels in the communications system. In actuality the transmit clock used by the master 110 may be a filtered version of GTX_CLK, obtained using a phase locked loop with a very narrow bandwidth, to reduce jitter. The transceiver 20 at the other end of the twisted wire pair 18, called the slave 112, synchronizes both the frequency and phase of its receive and transmit clocks to the signal received from the master 110, using the timing recovery system 64 (FIG. 7) located in the receiver 24. The slave 112 transmit clock maintains a fixed phase relationship with the slave receive clock at all times. The receive clock at the master 110 synchronizes, in phase but not in frequency, with the signal received from the slave transmitter 22. Thus, after an initial acquisition period, the master 110 receive clock follows the master transmit clock with a phase difference determined by the round trip delay of the loop. This phase relationship may vary dynamically as a result of the need of the master 110 receive clock to track jitter present in the signal received from the slave 112.

Figure 13:
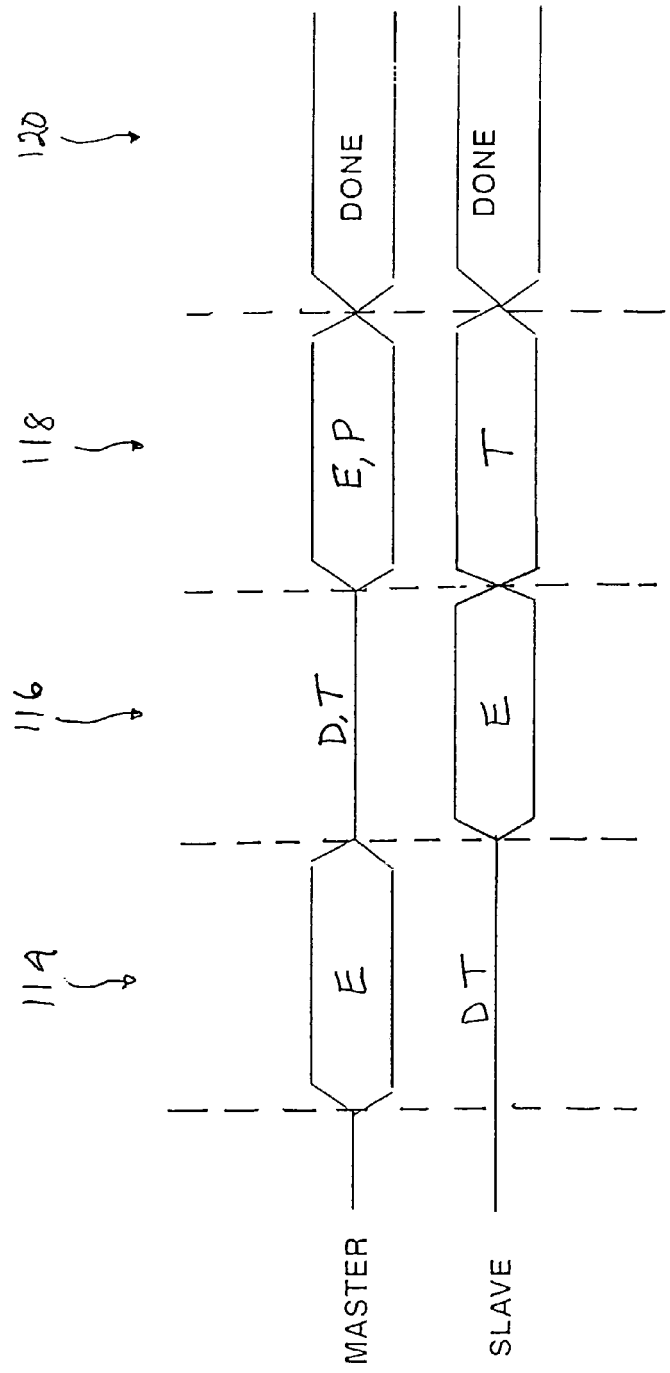
FIG. 13 is a timing diagram depicting the stages of a startup protocol in accordance with the invention.

The sequence of events during the startup protocol of the present invention is shown in FIG. 13. The protocol consists of three phases 114, 116, 118 during which the receivers are trained, e. g., adaptive filters are converged, timing synchronization is acquired, etc., followed by normal operation which begins during phase four 120. The startup protocol is initiated by the master when it starts transmitting a signal to the slave using a transmit clock signal which is fixed in both frequency and phase. During the first phase 114, the master trains its near-end noise reduction system by converging the adaptive filters contained within its echo canceller and NEXT cancellation system (E). As previously mentioned, the slave receiver includes a signal detector 41 (FIG. 7) which detects energy in the line coming from the master. Upon detection of the signal from the master, the slave trains its equalizers and far-end noise reduction system by converging the adaptive filters contained within its DFE, FFE and FEXT cancellation system (D). While training its equalizers and far-end noise reduction system the slave simultaneously acquires timing synchronization in both frequency and phase (T). It may also at this time compensate for the differential delay among the four twisted wire pairs, identify the four pairs, and correct the polarity of the pairs.

In one embodiment of the protocol, the transition from the first phase 114 to the second phase 116, at both master and slave, occurs after a fixed and prespecified period of time. In a preferred embodiment, however, the slave transitions from the first phase 114 to second phase 116 when it detects that its receiver has converged the adaptive filters contained within its DFE, FFE and FEXT cancellation system (D) and has acquired timing synchronization (T). The master receiver also includes a signal detector 41 (FIG. 7) which detects energy in the line coming from the slave. The master transitions from the first phase 114 to the second phase 116 when it detects this energy from the slave. Therefore, the slave takes the initiative in transitioning from the first phase 114 to the second phase 116, and the master follows when it detects the signal from the slave.

The convergence of the echo canceller and NEXT cancellation system during the first phase 114 at the master is done with the objective of allowing the signal detector at the master to detect the signal from the slave. Without proper echo and NEXT cancellation, the signal detector would be triggered by the echo and NEXT noise present in the receiver. After the transition has occurred, the master discards the echo canceller and NEXT cancellation system coefficients which result from the converging in the first phase 114. This may be done by resetting the adaptive filters in the echo canceller and NEXT cancellation system. It is important to note that the correct sampling phases for the four receivers at the master is obtained again in the third phase 118, therefore the echo canceller and NEXT cancellation system coefficients obtained during the first phase 114 may differ from the final values to be reacquired in the third phase 118.

During the second phase 116, the slave trains its near-end noise reduction system by converging the adaptive filters contained within its echo canceller and NEXT cancellation system (E). At the same time, the master trains its equalizers and far-end noise reduction system by converging the adaptive filters contained within its DFE, FFE and FEXT cancellation system (D). While training its equalizers and far-end noise reduction system, the master simultaneously acquires timing synchronization in phase only (P). The master may also at this time compensate for the differential delay among the four twisted wire pairs, identify the four pairs, and correct the polarity of the pairs. During the second phase, the slave saves the timing recovery state variables that had been acquired during the first phase 114, and freezes its frequency and phase. By doing this, the slave is guaranteed to sample with the correct phase, the signal coming to it from the master when the master resumes transmission at the beginning of the third phase 118. The slave also freezes the coefficients of the DFE, FFE and FEXT cancellation system acquired during the first phase 114. A startup protocol for use in a system having a slave which transmits using a free-running clock is disclosed in copending patent application Ser No. 09/078,466, (now U.S. Pat. No. 6,201,796, issued Mar. 13. 2001), entitled STARTUP PROTOCOL FOR HIGH THROUGHPUT COMMUNICATIONS SYSTEMS and assigned of record to the assignee of record of this application.

Similar to the transition from the first phase 114 to the second phase 116, the transition from the second phase 116 to the third phase 118 may occur after a fixed and prespecified period of time. While the duration of the first, second, and third phases 114, 116, 118 is fixed, the duration is not necessarily equal for all phases. In a preferred embodiment, however, the master transitions from the second phase 116 to third phase 118 when it detects that its receiver has converged the adaptive filters contained within its DFE, FFE and FEXT cancellation system (D) and has acquired timing synchronization (T). The master begins transmitting a signal to the slave. The slave transitions from the second phase 116 to the third phase 118 when it detects this signal from the master. Therefore the master takes the initiative in transitioning from the second phase 114 to the third phase 118, and the slave follows when it detects the signal from the master.

During the third phase 118, the slave freezes the coefficients of the echo canceller and the NEXT cancellation system and maintains its near-end noise reduction system in a steady state condition. Because the timing recovery state variables had not been saved at the transition to the second phase 116, the slave also reacquires timing synchronization in both frequency and phase (T) during the third phase 118. The master, during the third phase 118, freezes the coefficients of its DFE and FEXT cancellation system and the frequency of its clock signal. The master also retrains its near-end noise reduction system by reconverging its echo canceller and NEXT cancellation system (E). The master also reacquires timing synchronization in phase only (P). It is important to note that in the third phase 118 the slave resumes transmission using the clock recovered from the signal transmitted by the master, and therefore the master already knows the correct frequency with which to operate its receiver. The "relative sampling phases" of the four receivers, i.e., the differences in sampling phases of three of the receivers versus one of them arbitrarily used as reference, are also known because they were acquired during the second phase 116. However the "overall sampling phase" of the receivers, i.e., the sampling phase of the receiver arbitrarily chosen as reference, is not yet known and has to be acquired during the third phase 118. When both master and slave have completed their training operations, they exchange messages indicating that they are ready to transmit valid data. During phase four 120, all coefficients of the adaptive filters previously frozen are unfrozen and the transmission of data is ready to take place.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

The invention claimed is:

1. A startup protocol for use in a communications system having first and second transceivers operable to communicate with each other, each transceiver having a noise reduction system, a timing recovery system and an equalizer, the protocol comprising:
    executing a first stage during which the noise reduction system of the first transceiver is trained and the timing recovery system and the equalizer of the second transceiver are trained; and
    executing a second stage during which the timing recovery system and the equalizer of the first transceiver are trained and the noise reduction system of the second transceiver is trained.

2. The startup protocol of claim 1 wherein the first and second stages are executed at separate times.

3. The startup protocol of claim 1 wherein the second stage is executed after the first stage.

4. The startup protocol of claim 1 wherein the first transceiver acts as a master and the second transceiver acts as a slave.

5. The startup protocol of claim 4 wherein the first and second stages are executed at separate times.

6. The startup protocol of claim 4 wherein the second stage is executed after the first stage.

7. The startup protocol of claim 1 further comprising:
    executing a third stage during which the timing recovery systems of the first and second transceivers are retrained.

8. The startup protocol of claim 7 wherein the first transceiver acts as a master and the second transceiver acts as a slave.

9. The startup protocol of claim 8 wherein in the third stage, the timing recovery system of the master is retrained in phase.

10. A startup protocol for use in a communications system having first and second transceivers operable to communicate with each other, each transceiver having a noise reduction system and an equalizer, the protocol comprising:
    executing a first stage during which the noise reduction system of the first transceiver is trained and the equalizer of the second transceiver is trained; and
    executing a second stage during which the equalizer of the first transceiver is trained and the noise reduction system of the second transceiver is trained.

11. The startup protocol of claim 10 wherein the first and second stages are executed at separate times.

12. The startup protocol of claim 10 wherein the second stage is executed after the first stage.

13. The startup protocol of claim 10 wherein the first transceiver acts as a master and the second transceiver acts as a slave.

14. The startup protocol of claim 13 wherein the first and second stages are executed at separate times.

15. The startup protocol of claim 13 wherein the second stage is executed after the first stage.

16. The startup protocol of claim 10 further comprising:
    executing a third stage during which the noise reduction system of the first transceiver is retrained.

17. The startup protocol of claim 16 wherein the first transceiver acts as a master and the second transceiver acts as a slave.

18. A startup protocol for use in a communications system having first and second transceivers operable to communicate with each other, each transceiver having a timing recovery system and an equalizer, the protocol comprising:

executing a first stage during which the timing recovery system and the equalizer of the second transceiver are trained; and executing a second stage during which the timing recovery system and the equalizer of the first transceiver are trained.

19. The startup protocol of claim 18 wherein the first and second stages are executed at separate times.

20. The startup protocol of claim 18 wherein the second stage is executed after the first stage.

21. The startup protocol of claim 18 wherein the first transceiver acts as a master and the second transceiver acts as a slave.

22. The startup protocol of claim 21 wherein the first and second stages are executed at separate times.

23. The startup protocol of claim 21 wherein the second stage is executed after the first stage.

24. The startup protocol of claim 18 further comprising:
executing a third stage during which the timing recovery systems of the first and second transceivers are retrained.

25. The startup protocol of claim 24 wherein the first transceiver acts as a master and the second transceiver acts as a slave.

26. The startup protocol of claim 25 wherein in the third stage, the timing recovery system of the master is retrained in phase.

* * * * *